United States Patent [19]

Bumbarger

[11] Patent Number: 5,155,841
[45] Date of Patent: Oct. 13, 1992

[54] EXTERNAL CLOCK UNIT FOR A COMPUTER

[75] Inventor: Daniel L. Bumbarger, Hudson, Mass.

[73] Assignee: Nemonix, Inc., Hopkinton, Mass.

[21] Appl. No.: 586,944

[22] Filed: Sep. 24, 1990

[51] Int. Cl.⁵ .............................................. G06F 1/08
[52] U.S. Cl. ....................... 395/550; 364/DIG. 1; 364/DIG. 2; 364/934.2; 364/270.3; 364/270
[58] Field of Search ... 364/200 MS File, 900 MS File; 307/269

[56] References Cited

U.S. PATENT DOCUMENTS

| | | | |
|---|---|---|---|
| 4,191,998 | 3/1980 | Carmody | 364/200 |
| 4,217,637 | 8/1980 | Faulkner et al. | 364/200 |
| 4,277,693 | 7/1981 | Hoekman | 307/269 X |
| 4,322,580 | 3/1982 | Khan et al. | 364/900 X |
| 4,365,203 | 12/1982 | DiMassimo et al. | 307/269 X |
| 4,438,490 | 3/1984 | Wilder, Jr. | 364/200 |
| 4,458,308 | 7/1984 | Holtey et al. | 364/200 |
| 4,481,581 | 11/1984 | Johnson | 364/200 |
| 4,636,656 | 1/1987 | Snowden et al. | 364/900 X |
| 4,648,102 | 3/1987 | Riso et al. | 364/900 X |
| 4,821,229 | 4/1989 | Jauregui | 364/900 |
| 4,853,653 | 8/1989 | Maher | 331/49 |

Primary Examiner—Gareth D. Shaw
Assistant Examiner—Brian L. Klock
Attorney, Agent, or Firm—Kriegsman & Kriegsman

[57] ABSTRACT

An external clock unit for use with a DEC MICROVAX model 31 computer includes a first crystal oscillator for generating a clock signal of about 44 MHZ, a second crystal oscillator for generating a clock signal of about 63 MHZ, a 2 to 1 multiplexor for receiving 44 MHZ clock signal and the 63 MHZ clock signal and outputting one of clock signals, a first switch for selecting which of the two clock signals is to be outputted by the 2 to 1 multiplexor, a second switch for selecting which one of two logic signals is to be outputted by a system identification code generator in the computer and a power supply for providing power to the device. In use, the external clock unit is connected to jumper pins on the processor clock signal line and the system identification code generator.

6 Claims, 4 Drawing Sheets

EXTERNAL CLOCK UNIT FOR A COMPUTER

BACKGROUND OF THE INVENTION

The present invention relates generally to a device for increasing the operating speed of a Digital Equipment Corporation (DEC) MICROVAX model 3100 computer.

The DEC MICROVAX model 3100 computer, which is a very well known and widely used computer, has a central processing unit (CPU) module which includes a processor. The processor receives clock signals from a 44.444 MHZ oscillator located in the module. The cycle time of the processor using these 44.444 MHZ clock signals is about 80 nanoseconds.

It would be desirable to be able to increase the operating speed of this computer.

Accordingly, it is an object of this invention to provide a device for increasing the operating speed of a DEC MICROVAX model 3100 computer.

It is another object of this invention to provide a device for increasing the operating speed of a DEC MICROVAX model 3100 computer without altering the CPU module.

It is a further object of this invention to provide a device for increasing the operating speed of a DEC MICROVAX model 3100 computer without altering the CPU module and which will enable the computer to pass its self test on start up.

SUMMARY OF THE INVENTION

A device for increasing the operating speed of a DEC MICROVAX model 3100 computer constructed according to the teachings of the present invention comprises a first crystal oscillator for generating a clock signal of about 44 MHZ, a second crystal oscillator for generating a clock signal of about 63 MHZ, a 2 to 1 multiplexor for receiving the two clock signals and outputting one of the clock signals, a first switch coupled to said 2 to 1 multiplexor for selecting which of the two the clock signals is outputted by the multiplexor, a second switch adapted to be coupled to a system identification code generator in the computer for selecting a systems identification code to be emitted by the generator which will enable the computer to pass its self test on start up when either one of the two clock signals are outputted by the multiplexor and power supply means for providing operating power to the device.

The 44 MHZ clock signal produced by the device is used for test purposes while the 63 MHZ clock signal is used to produce an operating speed of the computer which is faster than that attainable using the 44.444 MHZ crystal oscillator in the CPU module.

The device is electrically connected to the computer through existing jumper pins on the CPU module.

Various features and advantages will appear from the description to follow. In the description, reference is made to the accompanying drawings which forms a part thereof and in which is shown by way of illustration a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore not to be taken in a limiting sense, and the scope of the present invention is best defined by the appended claims.

BRIEF DESCRIPTION OF THE DRAWINGS

In the drawings wherein like reference numerals represent like parts FIG. 1.

DETAILED DESCRIPTION OF PREFERRED EMBODIMENTS

Figure 1:
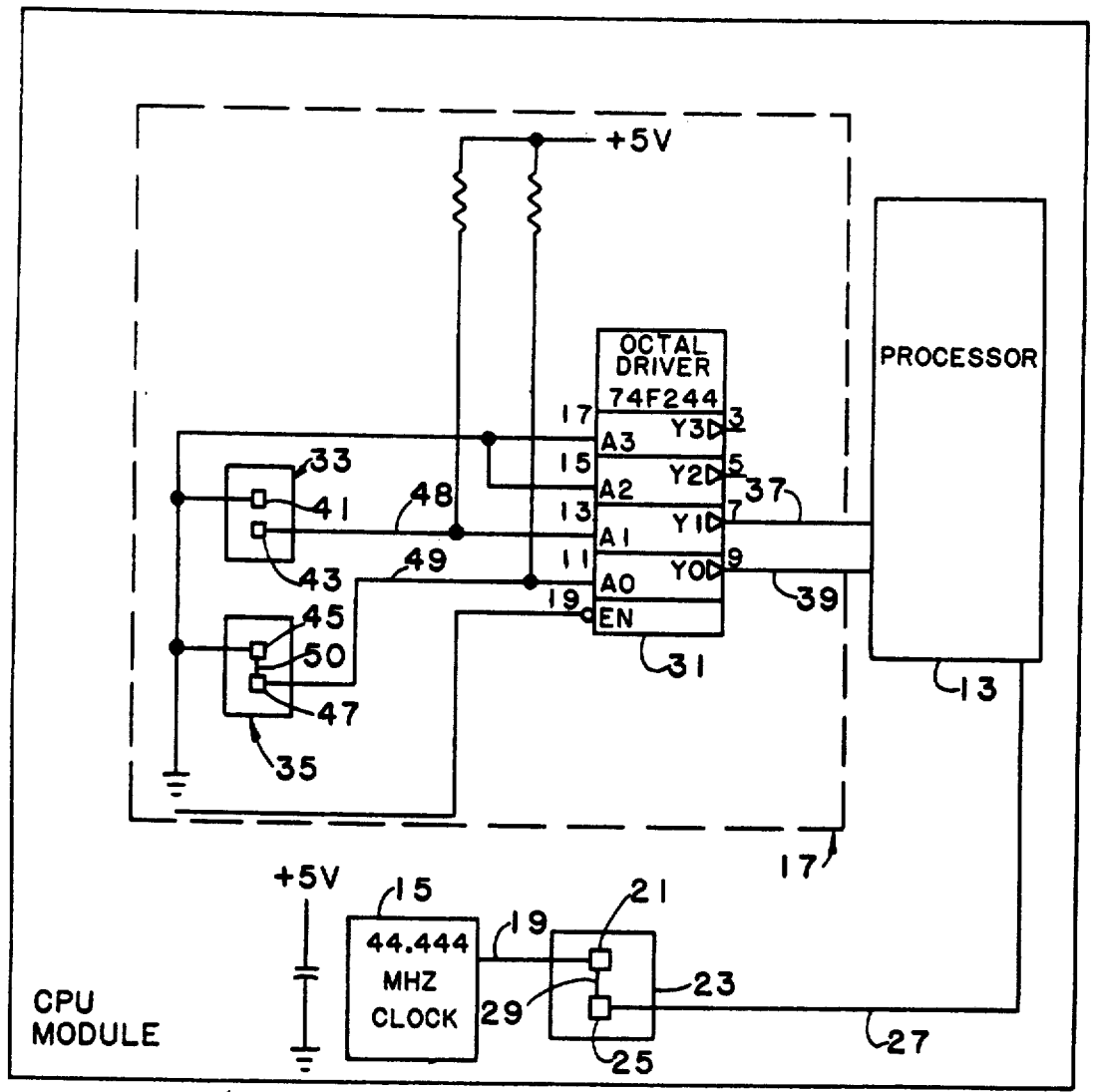
FIG. 1 is a simplified schematic diagram of the CPU module in the DEC MICROVAX model 3100 computer.

Referring now to the drawings, there is shown in FIG. 1 a simplified schematic diagram of the CPU module in a DEC MICROVAX model 3100 computer, the module being identified by reference numeral 11. Parts of module 11 not pertinent to the invention are not shown.

Module 11 includes a processor 13, a 44.444 MHZ crystal oscillator 15 and system identification code generator 17. Oscillator 15 is used to provide a clock signal for processor 15 while system identification code generator 17 is used to provide logic signals to processor 13 when the module is undergoing a self test routine on start-up.

Oscillator 15 is connected through a line 19 to pin 21 of a two pin connector 23. The other pin of connector 23, namely pin 25, is connected to a line 27 which is connected to processor 13. Pins 19 and 25 are normally electrically coupled to each other through a removable jumper 29, as shown.

System identification code generator 17 includes an octal driver 31, first and second two pin connectors 33 and 35, respectively, and associated circuitry. The outputs of octal driver 31 are over lines 37 and 39 and are connected to processor 13. The computer is programmed such that if the output signals over line 37 and 39 are a logic 1 and a logic 0, respectively, then the computer will pass a self test on start up if the processor cycle time is about 80 nanoseconds (i.e. the cycle time attainable with a clock signal of about 44 MHZ). On the other hand if the output signals are a logic 0 and a logic 1, respectively, then the computer will pass a self test on start up for a 60 nanosecond processor cycle time (i.e. a 63 MHZ clock signal). Connector 33 includes two pins numbered 41 and 43 while connector 35 includes two pins numbered 45 and 47. Pins 41 and 45 are connected to ground. Pins 43 and 47 are connected by lines 48 and 49 to driver 31. Normally, pins 41 and 43 of connector 33 are not connected while pins 45 and 47 of connector 35 are connected by a jumper 50 so as to provide the logic 1 and a logic 0 outputs from lines 37 and 39, respectively.

Figure 2:
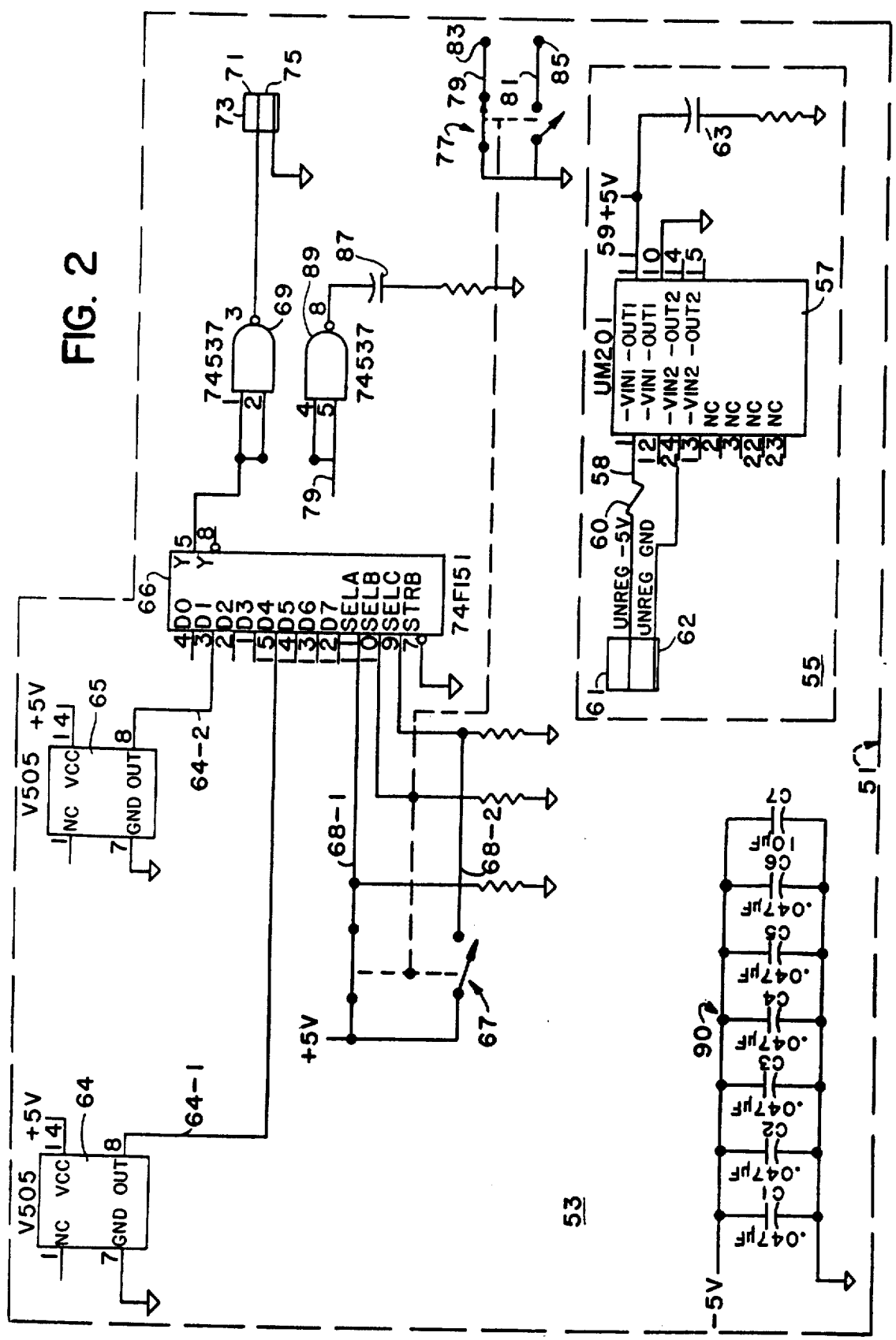
FIG. 2 is a schematic diagram of a device constructed according to the teachings of this invention for increasing the operating speed of the DEC MICROVAX model 3100 computer.

Referring now to FIG. 2, there is shown a schematic diagram of a device constructed according to the teachings of this invention for increasing the operating speed of the DEC MICROVAX model 3100 computer, the device, also referred to as an external clock unit, being identified by reference numeral 51.

Device 51 includes an operating section 53 and a power supply section 55.

Power supply section 55 provides power to operating section 53. Power supply section 55 includes a DC to DC converter 57 which receives an unregulated +5 volt input over line 58 and produces a regulated +5 volt output over a line 59. Line 58 includes a fuse 60. The unregulated +5 volt input in received from pin 61 of a two pin connector 62. A LED 63 is coupled to the regulated +5 V output of DC to DC converter 57 to indicate if there is a signal over line 59.

Operating section 53 includes a 44.444 MHZ crystal oscillator 64 and a 63.0 MHZ crystal oscillator 65. Crystal oscillator 64 is used to provide a clock signal for testing purposes as will hereinafter be explained while oscillator 65 is used to provide a higher clock signal than attainable from oscillator 15.

The output signals from crystal oscillators 64 and 65 are applied over lines 64-1 and 64-2, respectively, to a 2 to 1 multiplexor 66 which selects which oscillator signal is to be outputted.

A first two position double throw toggle switch 67 is coupled at one end to +5 volts and at the other end to multiplexor 66 and is used to select which oscillator signal from oscillators 64 and 65 is outputted. When switch 67 is in a first position (as shown), +5 volts is applied over line 68-1 to pin 11 in multiplexor 65 and the oscillator signal from oscillator 64 is selected while when switch 67 is in a second position +5 volts is applied over line 68-2 to pin 9 in multiplexor 66 and the oscillator signal from oscillator 65 is selected. The output signal from multiplexor 66 is driven by a line driver 69 to pin 71 in a connector 73. Connector 73 also includes a pin 75 which is connected to ground. A second two position double throw toggle switch 77 is connected at one end to ground and at the other end to either one of a pair of lines 79 and 81 which terminate in terminals 83 and 85, respectively. A LED 87 coupled to line 79 through a line driver 89 indicates when switch 77 is closed on line 79.

Operating section 53 also includes a bank of bi-pass capacitors 90 for eliminating noise, one capacitor being connected to each component. For simplicity, the connections are not shown.

Switch 67 and switch 77 are preferably ganged together (as shown by the dotted line).

Figure 3A:
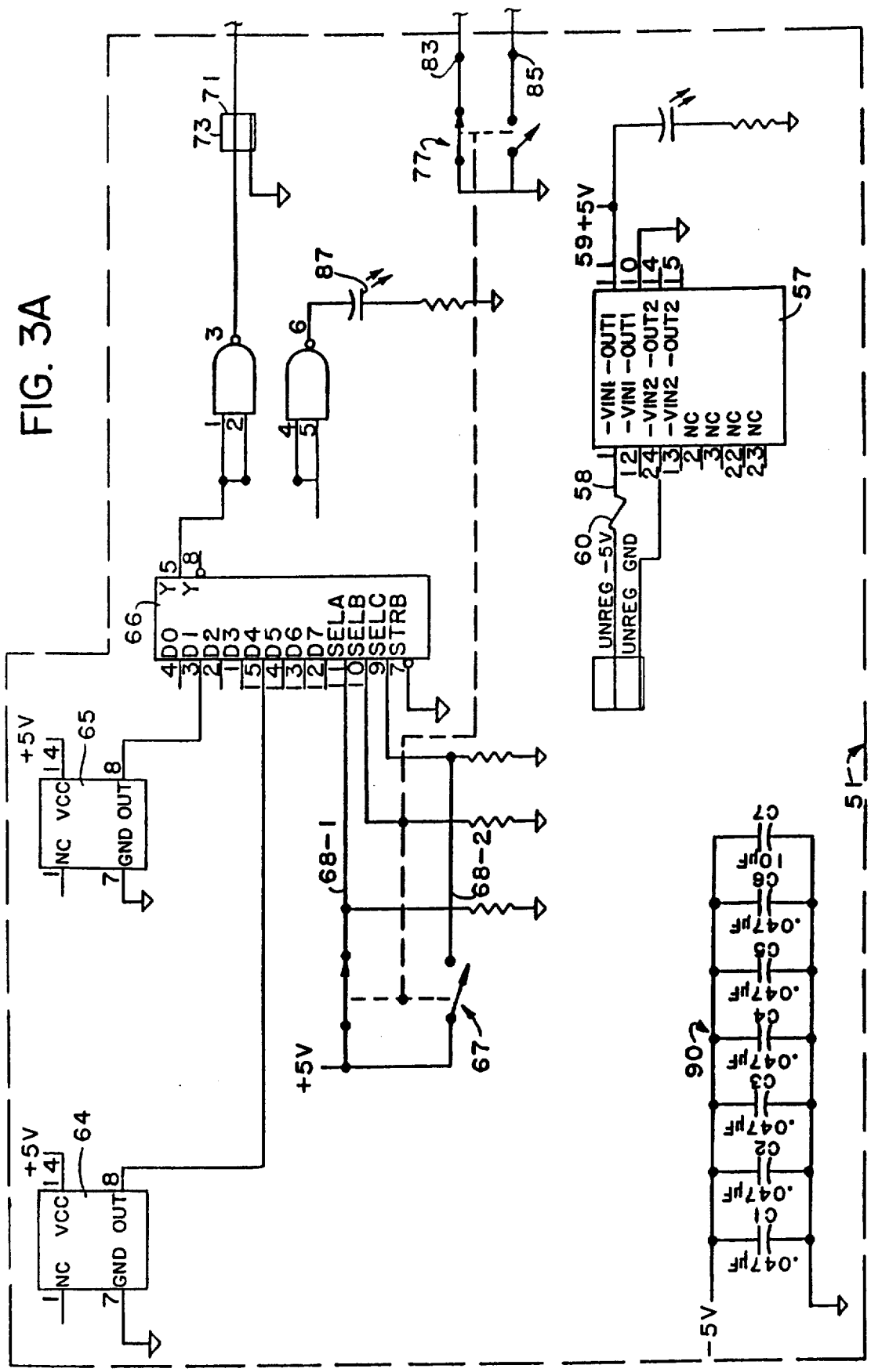
FIGS. 3A and 3B are diagrams showing how the device shown in FIG. 2 is operatively connected to the CPU module shown in FIG. 1.
Figure 3B:
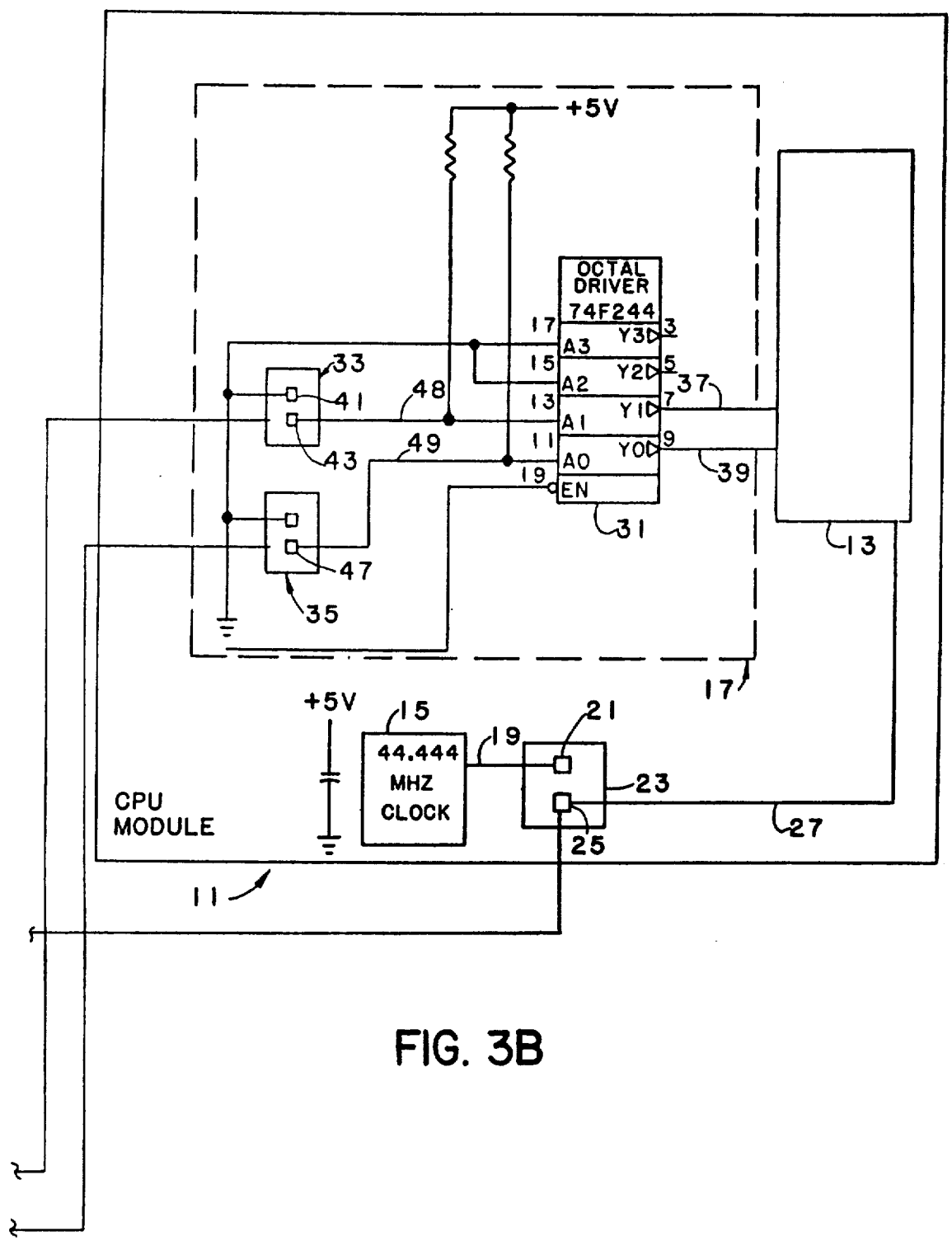

Referring now to FIG. 3, there is shown a schematic diagram of how device 51 is electrically connected to module 11. As can be seen, pin 71 in device 51 is connected to pin 25 of connector 23 in CPU module 11 and terminals 83 and 85 coupled to switch 77 are connected to pins 43 and 47 in connector 35. As can also be seen, the two jumpers 29 and 50 have been removed.

With the two switches arranged as shown, the 63.0 MHZ clock signal is fed into processor 13 along with the 0 and 1 logic signals. On the other hand, when the two switches are moved to their other position, the 44.444 MHZ signal is fed into processor 13 along with the 1 and 0 logic signal.

The embodiment of the present invention described above is intended to be merely exemplary and those skilled in the art shall be able to make numerous variations and modifications to it without departing from the spirit of the present invention. All such variations and modifications are intended to be without the scope of the present invention as defined in the appended claims.

What is claimed is:

1. An external clock unit for a DEC MICROVAX model 3100 computer, the DEC MICROVAX model 3100 computer having a CPU module which includes a processor, a 44.444 MHZ clock and a system identification code generator, said system identification code generator being constructed so that it can be arranged to output either a first set of logic signals or a second set of logic signals, said first set of logic signals being used to enable said DEC MICROVAX model 3100 computer to pass self test on start up when said processor is operating with clock signals of 44.444 MHZ and said second set of logic signals being used to enable said DEC MICROVAX model 3100 computer to pass self test on start up when said processor is operating with clock signals of 63.0 MHZ, the external clock unit operating independent of said processor and comprising:

a. a first oscillator for generating clock signals of 44.444 MHZ,
b. a second oscillator for generating clock signals of 63.0 MHZ,
c. a 2 to 1 multiplexor for receiving said clock signals from said first and second oscillators and outputting one of said clock signals at a first output terminal,
d. a first manually operable switch coupled directly to said multiplexor for selecting which clock signal is to be outputted by the multiplexor,
e. a second manually operable switch adapted to be connected to said system identification code generator for controlling which set of logic signals is outputted by said signal indentification code generator, and
f. a power supply for providing operating power for said external clock unit.

2. The external clock unit of claim 1 and wherein said first and second manually operable switches are ganged together.

3. The external clock unit of claim 2 and wherein said first and second oscillators are crystal oscillators.

4. The external clock unit of claim 3 and wherein said power supply includes a DC to DC converter.

5. The external clock unit of claim 4 and further including means for indicating that the power is on and means for indicating which external clock signal is being outputted.

6. In a DEC MICROVAX Model 3100 computer having a CPU module, the CPU module including a processor, an internal clock for providing clock signals of 44.444 MHZ and a system identification code generator for providing either a first set of logic signals to enable said computer to pass self test on start up with clock signals of 44.444 MHZ or a second set of logic signals to enable said computer to pass self test on start up with clock signals of 63.0 MHZ, the improvement comprising an external clock unit for providing an external clock signal to said processor, said external clock unit comprising:

a. a first oscillator for generating clock signals of 44.444 MHZ,
b. a second oscillator for generating clock signals of 63.0 MHZ,
c. a multiplexor for receiving both of said clock signals and outputting one of said clock signals over a first terminal, said first terminal being coupled to said processor,
d. a first manually operable switch coupled to said multiplexor for selecting which clock signals are to be outputted by the multiplexor,
e. a second manually operable switch coupled to said system identification code generator in said CPU module for causing said system identification generator to send out said first set of logic signals if the multiplexor outputs clock signals of 44.444 MHZ or to send out said second set of logic signals if the multiplexor outputs the clock signals of 63.0 MHZ, and f. a power supply for providing operating power for said external clock unit.

* * * * *